(12) United States Patent
Kim et al.

(10) Patent No.: US 9,112,606 B2
(45) Date of Patent: Aug. 18, 2015

(54) METHOD AND APPARATUS FOR TRANSMITTING AND RECEIVING DATA USING VISIBLE LIGHT COMMUNICATION

(75) Inventors: You Jin Kim, Daejeon (KR); Tae-Gyu Kang, Daejeon (KR); Sang-Kyu Lim, Daejeon (KR); Dae Ho Kim, Daejeon (KR); Il-Soon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 651 days.

(21) Appl. No.: 13/323,331

(22) Filed: Dec. 12, 2011

(65) Prior Publication Data

US 2012/0155889 A1    Jun. 21, 2012

(51) Int. Cl.
*H04B 10/00* (2013.01)
*H04B 10/116* (2013.01)

(52) U.S. Cl.
CPC .................................... *H04B 10/116* (2013.01)

(58) Field of Classification Search
CPC ........................................................ H04B 10/116
USPC .......................................................... 398/182
See application file for complete search history.

(56) References Cited

U.S. PATENT DOCUMENTS

| | | | |
|---|---|---|---|
| 6,279,830 B1 * | 8/2001 | Ishibashi ...................... 235/494 |
| 7,714,892 B2 * | 5/2010 | Clark et al. .............. 348/208.99 |
| 7,728,893 B2 * | 6/2010 | Kagawa et al. ............... 348/302 |
| 2002/0023961 A1 * | 2/2002 | Itou et al. ................. 235/472.01 |
| 2002/0142504 A1 * | 10/2002 | Feldman et al. ................ 438/30 |
| 2008/0106608 A1 * | 5/2008 | Clark et al. .............. 348/208.99 |
| 2010/0084470 A1 * | 4/2010 | Scott et al. ............... 235/462.09 |
| 2012/0155889 A1 * | 6/2012 | Kim et al. ...................... 398/193 |
| 2012/0303323 A1 * | 11/2012 | Ha et al. ........................ 702/183 |

FOREIGN PATENT DOCUMENTS

KR   1020100013245   2/2010

* cited by examiner

*Primary Examiner* — Danny Leung
(74) *Attorney, Agent, or Firm* — Nelson Mullins Riley & Scarborough LLP

(57) ABSTRACT

A transmitting apparatus using visible light communication generates transmission data into a two-dimensional data code according to a predetermined code method between the transmitting apparatus and a receiving apparatus and transmits the two-dimensional data code through a plurality of light emitting diodes (LED) that are arranged in a two-dimensional form. Therefore, the receiving apparatus senses light from a plurality of LEDs as an image using an image sensor, demodulates the image into a two-dimensional data code, decodes the two-dimensional data code using a code book, and restores data.

8 Claims, 13 Drawing Sheets

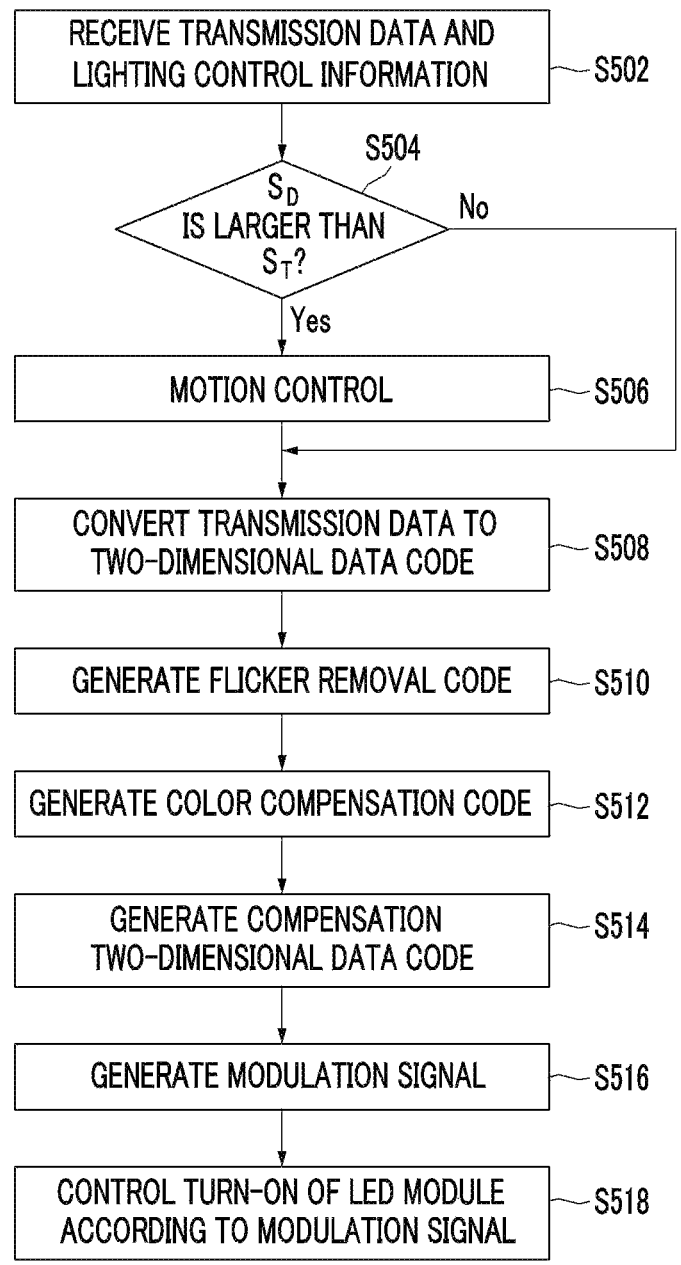

METHOD AND APPARATUS FOR TRANSMITTING AND RECEIVING DATA USING VISIBLE LIGHT COMMUNICATION

CROSS-REFERENCE TO RELATED APPLICATION

This application claims priority to and the benefit of Korean Patent Application No. 10-2010-0128566 and 10-2011-0051624 filed in the Korean Intellectual Property Office on Dec. 15, 2010 and May 30, 2011, the entire contents of which are incorporated herein by reference.

BACKGROUND OF THE INVENTION (a) Field of the Invention

The present invention relates to a method and apparatus for transmitting/receiving data using visible light communication. More particularly, the present invention relates to a method of transmitting data using light generating in a light emitting diode lighting device and of receiving data using an image sensor that senses light as an image.

(b) Description of the Related Art

Nowadays, as a lighting device using a light emitting diode (LED) as a light source is widely used, visible light communication (VLC) technology that can communicate with an LED lighting device has been introduced.

The VLC technology is communication technology that loads data at a visible light wavelength band of light in which a person can recognize with eyes and that transmits the data by wireless. Because the VLC technology uses a visible light wavelength band, the VLC technology can simultaneously perform lighting and communication and thus the VLC technology has a characteristic and a merit different from communication technology using a laser diode (LD) and communication technology of an infrared ray band and an ultraviolet ray (UV) band.

Visible light lighting in which a person can recognize can be variously used for an electric scoreboard, a sign board, a flat panel display back light unit (BLU), and an indoor/outdoor illuminating lamp. Lighting that is used in this way is disposed to correspond to a use purpose using one LED or a plurality of LEDs, and the use number thereof is determined.

The LED is used as lighting using a property that changes electricity to light. Communication using an LED lighting device sustains communication as well as basic lighting as the receiving side recognizes flickering of light of the transmission side. A lighting device in which a person uses should not have flickering for eye-safety, should sustain sufficient illumination Intensity according to a purpose, and should have a dimming function of sometimes adjusting brightness of light. Further, in order to use for communication, the lighting device should have a function of transmitting data by wireless.

FIG. 1 is a diagram illustrating a configuration of a conventional data communication apparatus using visible light communication.

Referring to FIG. 1, a transmitter 10 includes a controller 11, a modulation unit 12, a light source driver 13, and an array light source 14 including a plurality of LEDs that are coupled in series and in parallel, and a receiver 20 includes a photoelectric converter 21 including a photo diode or an image sensor, a demodulation unit 22, and a data processor 23.

The modulation unit 12 modulates transmission data that are input from the controller 11, and the light source driver 13 drives the array light source 14 and transmits data that are modulated in the modulation unit 12 through light that is emitted from the array light source 14.

Further, data that are transmitted through light are received in the photoelectric converter 21 of the receiver 20, are converted to an electrical signal, are demodulated in the demodulation unit 22, are restored to transmission data, and the data processor 23 processes transmission data to correspond to a corresponding application. In this case, technology that performs communication using a wavelength of light that is emitted from the array light source 14 as a visible light band becomes VLC technology.

When transmitting data, the transmitter 10 loads and transmits data by simultaneously quickly turning on/off a plurality of LEDs. That is, a set of a plurality of LEDs is transmitted as one light source. Therefore, a data amount to be transmitted is limited as an ability that can transmit from one array light source 14, which is an assembly of a plurality of LEDs and thus a limitation exists in increasing a transmission data amount.

Further, because the receiver 20 using an image sensor should identify data with a flicker of light within frames per second in a pixel range in which an image sensor can receive, data reception is limited to frames per second in which an image sensor can sense.

"Imaging device and method for reading signals from such device (U.S. Pat. No. 7,728,893 B2)", which are a related art that is related to VLC relate to an apparatus that can simultaneously receive information of different ID beacons, if ID beacon light exists within a pixel position at which an image sensor can receive, when ID beacon light using LED lighting is transmitted from a plurality of different positions. In this case, because information in which each ID beacon generates is individual information, there is a drawback that a data receiving amount is limited to frames per second in which an image sensor can sense.

Further, as another related art, "two-dimensional barcode localization for camera based devices (Pub. No. US 2010/0084470 A1)" is a method of recognizing and decoding a two-dimensional barcode using a camera, and the two-dimensional barcode has a relatively more information amount than that of an one-dimensional barcode, but because the two-dimensional barcode has no function changing on a time zone basis, the two-dimensional barcode has a drawback that can read only a limited information amount.

As another related art, "LED display (Korean Patent Application Laid-open No. 10-2010-0013245) using an optical recognition pen" is technology that puts a barcode beside a display using an LED and in which an optical recognition pen device for recognizing the barcode recognizes the barcode, sends a control command by wireless, and changes display contents of the LED display. The technology changes contents of the LED display by assistance of an external system with fixed and limited barcode information and thus has a drawback that information can be acquired only when a communication function such as a network is mounted.

SUMMARY OF THE INVENTION

The present invention has been made in an effort to provide a method and apparatus for communicating using visible light communication having advantages of transmitting/receiving data without separately mounting a communication function, increasing a transmitted/received data amount, and increasing an information amount of received data more than a received data amount.

An exemplary embodiment of the present invention provides a transmitting apparatus of data using visible light communication. The transmitting apparatus includes a code generator, a modulation unit, a plurality of light emitting diodes (LED), and a light source driver. The code generator converts transmission data to a two-dimensional data code according to a predetermined code method between the transmitting apparatus and a receiving apparatus. The modulation unit generates a modulation signal by modulating the two-dimensional data code. The plurality of LEDs are arranged in a two-dimensional form and emit light when turned on. The light source driver controls the turn-on of the plurality of LEDs according to the modulation signal.

The transmitting apparatus may further include a flicker and color compensation unit.

The flicker and color compensation unit may compensate a color of the two-dimensional data code using dimming data and color data of lighting control information that is input from the outside.

The flicker and color compensation unit may remove a flicker from the two-dimensional data code by generating a flicker removal code using dimming data and color data of lighting control information that is input from the outside.

The transmitting apparatus may further include a controller. The controller may perform a motion control when a size of the transmission data is larger than a size of maximum data to be transmit by the plurality of LEDs. The code generator may divide the transmission data into a predetermined size according to the motion control, generate each data into a two-dimensional data code, and sequentially output each two-dimensional data code to the modulation unit.

Another embodiment of the present invention provides an apparatus that receives transmitted data using visible light communication. The receiving apparatus includes an image sensor, a demodulation unit, and a decoding unit. The image sensor receives transmission data that are converted to a two-dimensional data through light of a plurality of LEDs that are arranged in a two-dimensional form and senses transmitted light as an image. The demodulation unit demodulates the image into the two-dimensional data code. The decoding unit restores data by decoding the two-dimensional data code.

The decoding unit may decode the two-dimensional data code using a code book including code decoding information.

The receiving apparatus may further include a code removal unit. The code removal unit may remove a code for removing a flicker from the two-dimensional data code and output the two-dimensional data code to the decoding unit. The code removal unit may remove a code for compensating a color from the two-dimensional data code and output the two-dimensional data code to the decoding unit.

Yet another embodiment of the present invention provides a method of transmitting data using visible light communication in a transmitting apparatus. The method includes generating transmission data into a two-dimensional data code according to a predetermined code method between a transmitting apparatus and a receiving apparatus; modulating the two-dimensional data code into a modulation signal; and emitting light by controlling the turn-on of a plurality of LEDs that are arranged in a two-dimensional form according to the modulation signal.

The method may further include removing a flicker from the two-dimensional data code and compensating a color change before the modulating of the two-dimensional data code.

The generating of transmission data may include dividing, if a size of the transmission data is larger than a predetermined threshold value, the transmission data into a plurality of data having a predetermined size by performing a motion control and converting the plurality of data to a plurality of two-dimensional data codes, respectively.

The plurality of two-dimensional data codes have different colors and patterns.

Yet another embodiment of the present invention provides a method of receiving data using visible light communication in a receiving apparatus. The method includes receiving transmission data that are converted to a two-dimensional data code through light of a plurality of LEDs that are arranged in a two-dimensional form; sensing the light as an image; and performing a direct processing of the image or restoring the data from the image according to a user application.

The restoring of data from the image may include demodulating the image into a two-dimensional data code; and decoding the two-dimensional data code into the data.

BRIEF DESCRIPTION OF THE DRAWINGS

FIG. 5 is a flowchart illustrating a method of transmitting data in an LED lighting device according to an exemplary embodiment of the present invention.

DETAILED DESCRIPTION OF THE EMBODIMENTS

Figure 1:
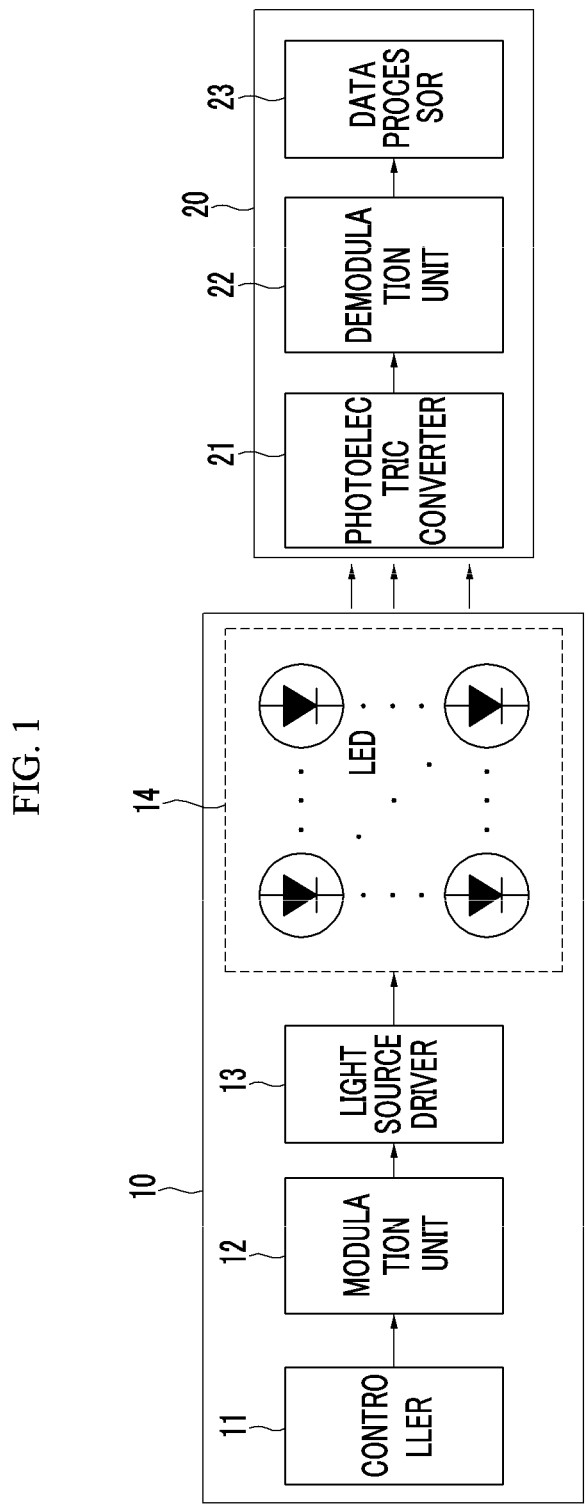
FIG. 1 is a diagram illustrating a configuration of a data communication apparatus using visible light communication.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising", will be understood to imply the inclusion of stated elements but not the exclusion of any other elements.

Hereinafter, a method and apparatus for communicating using visible light communication according to an exemplary embodiment of the present invention will be described in detail with reference to the drawings.

Figure 2:
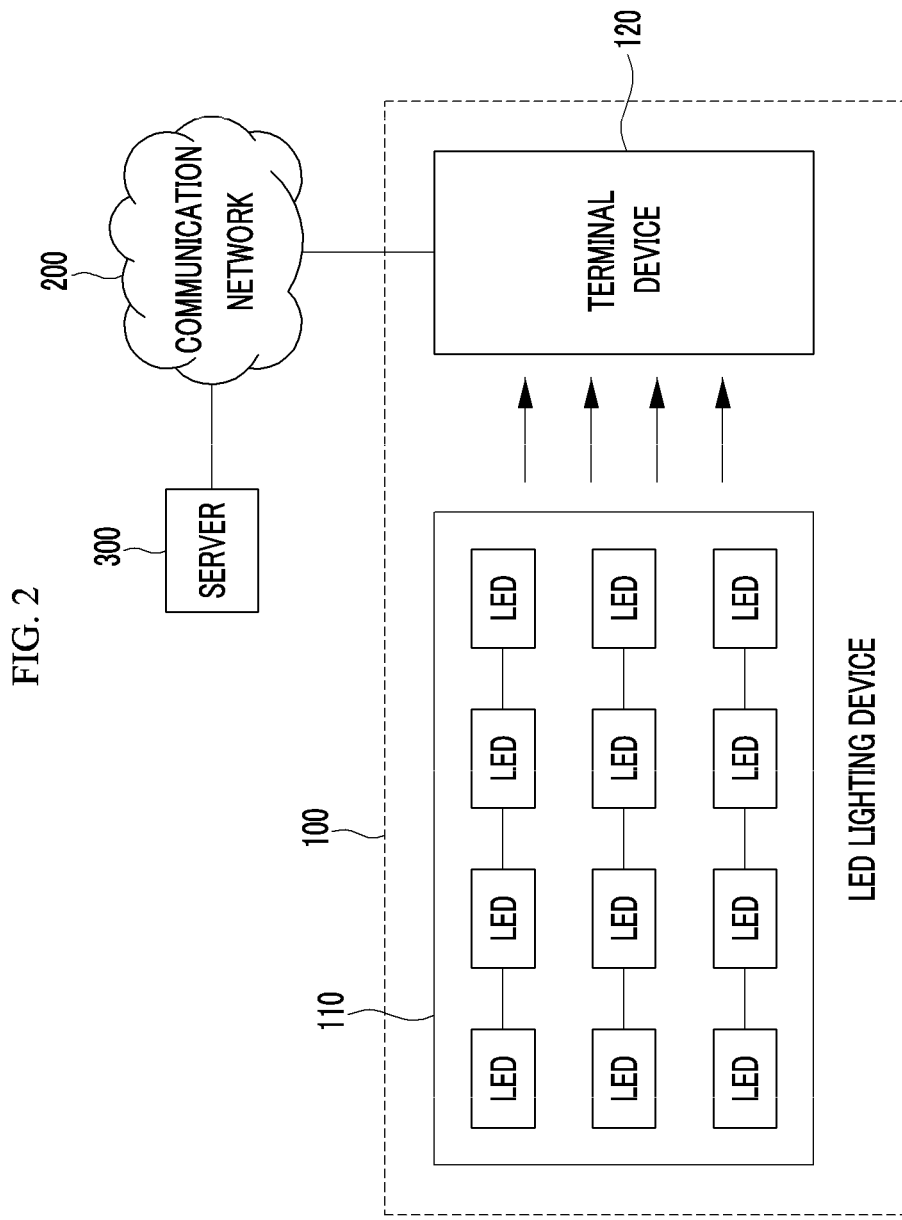
FIG. 2 is a diagram illustrating a transmitting/receiving apparatus using visible light communication according to an exemplary embodiment of the present invention.

FIG. 2 is a diagram illustrating a transmitting/receiving apparatus using visible light communication according to an exemplary embodiment of the present invention.

Referring to FIG. 2, a communication apparatus 100 using visible light communication includes a light emitting diode (LED) lighting device 110 corresponding to a transmitting apparatus and a terminal device 120 corresponding to a receiving apparatus.

The LED lighting device 110 includes a plurality of LEDs that can be controlled individually or collectively, and the plurality of LEDs have two-dimensional arrangement.

The LED lighting device 110 converts an electric signal to light through the plurality of LEDs and uses the light as lighting.

Further, the LED lighting device 110 performs communication with the terminal device 120 using visible light communication. Specifically, the LED lighting device 110 receives data and control information (hereinafter, referred to as "transmission data") to transmit from a user application to generate the transmission data into a two-dimensional data code, loads a two-dimensional data code at a visible light band of light that emits by a plurality of LEDs, and transmits the two-dimensional data code. In this way, when the LED lighting device 110 converts transmission data to a two-dimensional data code and transmits the two-dimensional data code through a plurality of LEDs, a transmission data amount may be increased.

The terminal device 120 senses light from the LED lighting device 110 as an image using an image sensor, a photo diode, or a photo diode array, demodulates the sensed image, reads a two-dimensional data code, decodes the two-dimensional data code, and restores the two-dimensional data code to original transmission data.

The terminal device 120 decodes using a code book for decoding the two-dimensional data code. The code book stores code decoding information for decoding a two-dimensional data code, and the terminal device 120 receives a code book from a server 300 via a communication network 200 such as Internet through wired/wireless communication. When decoding is performed in this way, if a code book is used, an information amount more than received data can be obtained.

The terminal device 120 transfers the restored transmission data to a user application with assistance of an application processor of the terminal device 120 or provides to another user or a server through the communication network 200.

Figure 3:
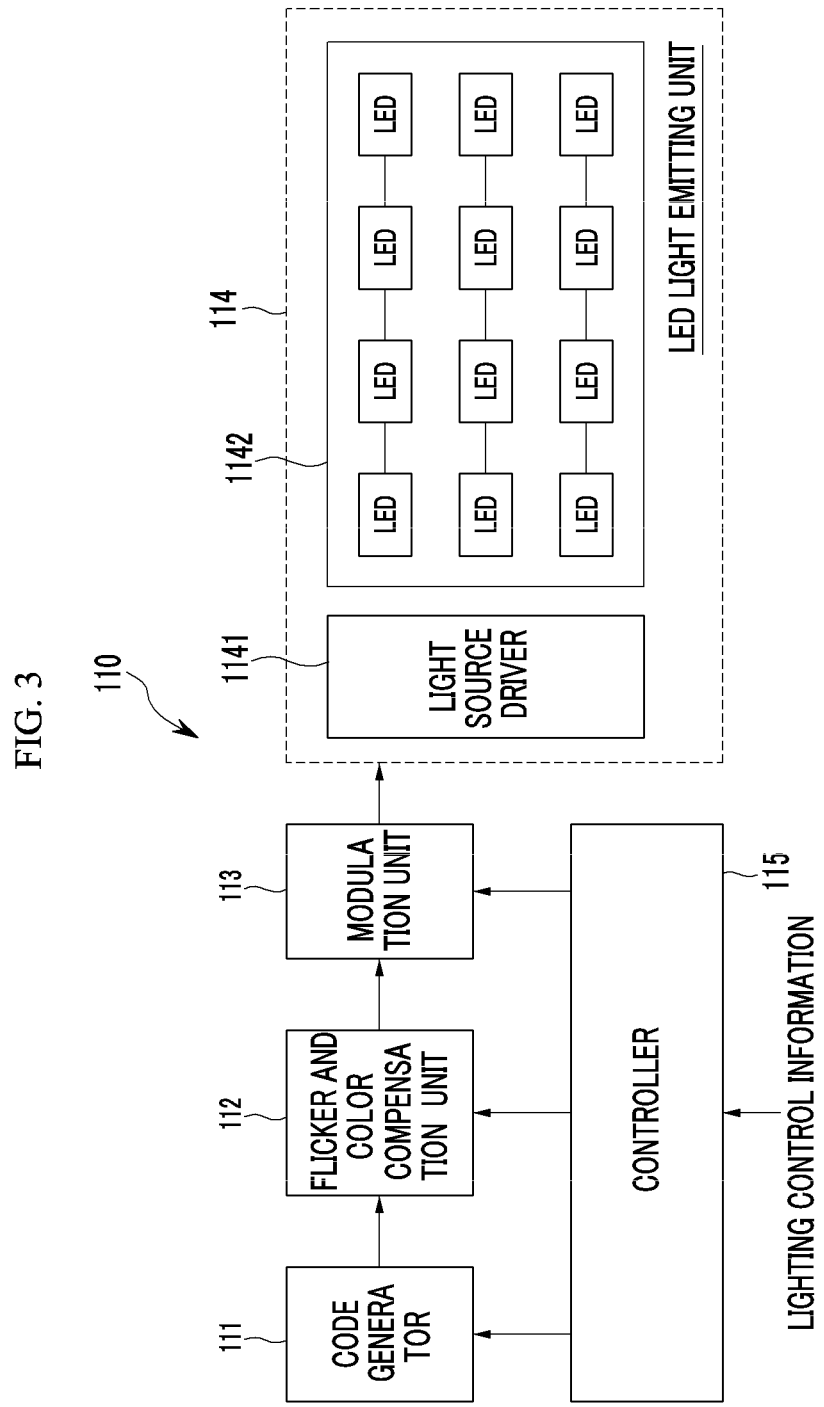
FIG. 3 is a diagram illustrating an LED lighting device that is shown in FIG. 1.
Figure 4:
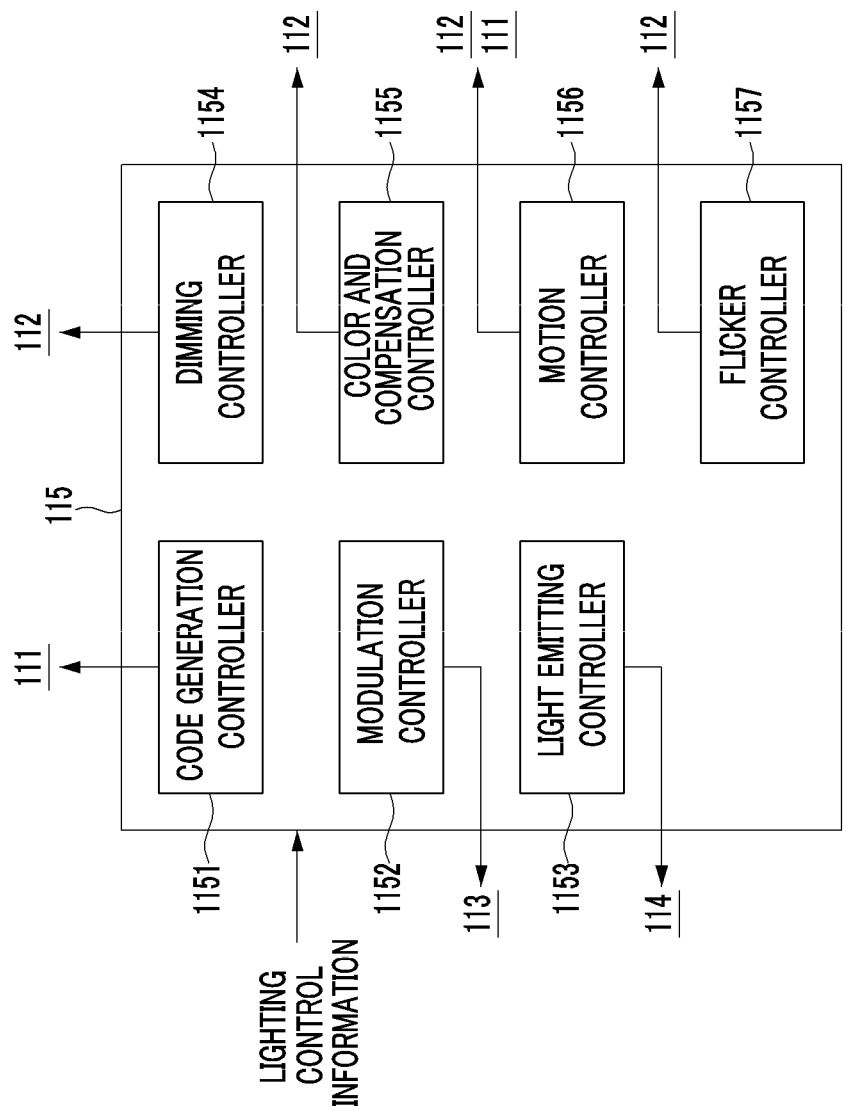
FIG. 4 is a diagram illustrating a controller that is shown in FIG. 3.

FIG. 3 is a diagram illustrating an LED lighting device that is shown in FIG. 1, and FIG. 4 is a diagram illustrating a controller that is shown in FIG. 3.

Referring to FIG. 3, the LED lighting device 110 includes a code generator 111, a flicker and color compensation unit 112, a modulation unit 113, an LED light emitting unit 114, and a controller 115.

Transmission data are input to the code generator 111 according to the control of the controller 115 based on lighting control information. The lighting control information includes code control data, modulation control data, lighting control data, color data, dimming data, and flicker control data.

Referring to FIG. 4, the controller 115 includes a code generation controller 1151, a modulation controller 1152, a light emitting controller 1153, a dimming controller 1154, a color and compensation controller 1155, a motion controller 1156, and a flicker controller 1157.

The code generation controller 1151 generates a code control signal corresponding to code control data of lighting control information and transfers the code control signal to the code generator 111. The code control data may include data representing a predetermined code generation method between a transmitter and a receiver, i.e., the LED lighting device 110 and the terminal device 120.

The modulation controller 1152 generates a modulation control signal corresponding to modulation control data of lighting control information and transfers the modulation control signal to the modulation unit 113. The modulation control data may include data representing a modulation method to use in the modulation unit 113.

The light emitting controller 1153 converts lighting control data of lighting control information to a driving control signal such as pulse width modulation (PWM) and transfers the driving control signal to the LED light emitting unit 114.

The dimming controller 1154 extracts dimming data from lighting control information, generates a dimming control signal corresponding to the dimming data, and transfers the dimming control signal to the flicker and color compensation unit 112. The dimming data may include data representing lighting brightness of the LED lighting device 110.

The color and compensation controller 1155 extracts color data from lighting control information, generates a color control signal corresponding to the color data, and transfers the color control signal to the flicker and color compensation unit 112. The color data include color information in which a user wants to express through the LED lighting device 110.

If an entire size of transmission data is larger than a predetermined threshold value, the motion controller 1156 determines a motion control that controls to divide and transmit transmission data and transfers a motion control signal to the code generator 111 and the flicker and color compensation unit 112.

The flicker controller 1157 extracts flicker control data from lighting control information, generates a flicker control signal corresponding to the flicker control data, and transfers the flicker control signal to the flicker and color compensation unit 112.

Referring again to FIG. 3, the code generator 111 processes transmission data according to a motion control signal and a color control signal of the controller 115, converts the transmission data to a two-dimensional data code using a predetermined code generation method according to a code control signal of the controller 115, and transfers the two-dimensional data code to the flicker and color compensation unit 112. That is, the code generator 111 generates a two-dimensional data code using a predetermined code generation method between a transmitter and a receiver, i.e., the LED lighting device 110 and the terminal device 120.

When the code generator 111 receives a motion control signal from the controller 115, the code generator 111 divides transmission data into a predetermined size of data and converts the transmission data to two-dimensional data code having different colors and patterns.

The flicker and color compensation unit 112 receives a motion control signal, a color control signal, and a dimming control signal of the controller 115, generates a code for removing a flicker, generates a code for compensating a color, removes a flicker from the two-dimensional data code, compensates a color of the two-dimensional data code, and outputs the two-dimensional data code to the modulation unit 113.

When the two-dimensional data code that is generated in the code generator 111 is input to the LED light emitting unit 114 through the modulation unit 113, a light emitting degree of each of code elements in the LED light emitting unit 114 may be different. When the two-dimensional data code passes through the flicker and color compensation unit 112, as in an exemplary embodiment of the present invention, a flicker is removed and a color is compensated and thus a color rendering index may be sustained upon white lighting. Thereby, a color expression between code elements can be naturally performed.

In the following description, in order to distinguish a two-dimensional data code that is output from the code generator 111 and a two-dimensional data code that is output from the flicker and color compensation unit 112, a two-dimensional data code that is output from the flicker and color compensation unit 112 is referred to as a "compensation two-dimensional data code".

The modulation unit 113 modulates a compensation two-dimensional data code with a predetermined modulation method and transfers the compensation two-dimensional data code to the LED light emitting unit 114. The modulation unit 113 may use a modulation method such as on-off keying, pulse position modulation, orthogonal frequency division multiplexing, and pulse amplitude modulation and determine a modulation method according to a modulation control signal of the modulation controller 1152.

The LED light emitting unit 114 includes a light source driver 1141 and an LED light source module 1142. The light source driver 1141 drives the LED light source module 1142. The LED light source module 1142 includes a plurality of LEDs having two-dimensional arrangement, and the plurality of LEDs are turned on by a driving signal of the light source driver 1141 to generate light of a visible light band. An amount of codes that can be generated according to arrangement and the number of LEDs is changed. In this case, as shown in FIG. 3, arrangement of a plurality of LEDs may be formed in a matrix form and may be formed in a polygonal form such as a circle, a triangle, and a pentagon. Further, the LED may be a monochrome LED of green, red, blue, and white and may be a multi-color LED that can represent a plurality of colors.

The light source driver 1141 controls a turn-on state and a turn-off state and dimming and color of a plurality of LEDs and performs a function of modulating light of a plurality of LEDs according to a modulation signal from the modulation unit 113.

That is, the light source driver 1141 receives a driving control signal of the light emitting controller 1153, applies a corresponding current and voltage to a plurality of LEDs, drives a plurality of LEDs, and turns on and off a plurality of LEDs according to a modulation signal from the modulation unit 113, thereby modulating light of a plurality of LEDs.

Finally, data are converted and transmitted to a two-dimensional data code through light that is emitted from a plurality of LEDs.

FIG. 5 is a flowchart illustrating a method of transmitting data in an LED lighting device according to an exemplary embodiment of the present invention.

Referring to FIG. 5, when the controller 115 of the LED lighting device 110 receives lighting control information and transmission data (S502), the controller 115 compares an entire size $S_D$ of the transmission data with a threshold value $S_T$ (S504). The threshold value $S_T$ indicates a size of maximum data that can express at one time in the LED light source module 1142.

If an entire size $S_D$ of the transmission data is larger than a threshold value $S_T$, the controller 115 determines a motion control that divides the transmission data into a predetermined size and that sequentially transmits the transmission data (S506), and generates a motion control signal and transfers the motion control signal to the code generator 111 and the flicker and color compensation unit 112.

The controller 115 generates a dimming control signal and a color control signal corresponding to dimming data and color data, respectively, of lighting control information, outputs the dimming control signal to the flicker and color compensation unit 112, and outputs the color control signal to the code generator 111 and the flicker and color compensation unit 112.

Further, the controller 115 outputs a modulation control signal representing a modulation method to use and a code control signal representing a code generation method to use to the modulation unit 113 and the code generator 111, respectively.

When transmission data are input, the code generator 111 converts transmission data to a two-dimensional data code with a motion control signal and a color control signal (S508). The generated two-dimensional data code is represented by Equation 1.

$$D\_func(x, y) = \begin{bmatrix} D_{00} & \cdots & D_{0n} \\ \vdots & \ddots & \vdots \\ D_{n0} & \cdots & D_{nn} \end{bmatrix} \quad \text{[Equation 1]}$$

In Equation 1, D_func (x, y) represents a two-dimensional data code.

The flicker and color compensation unit 112 generates a flicker removal code for removing a flicker from a two-dimensional data code with a motion control signal, a color control signal, and a dimming control signal (S510). The generated flicker removal code is represented by Equation 2.

$$F\_func(x, y) = \begin{bmatrix} F_{00} & \cdots & F_{0n} \\ \vdots & \ddots & \vdots \\ F_{n0} & \cdots & F_{nn} \end{bmatrix} \quad \text{[Equation 2]}$$

In Equation 2, F_func (x, y) represents a flicker removal code.

Further, the flicker and color compensation unit 112 generates a color compensation code with a motion control signal, a color control signal, and a dimming control signal (S512), and the color compensation code is represented by Equation 3.

$$C\_func(x, y) = \begin{bmatrix} C_{00} & \cdots & C_{0n} \\ \vdots & \ddots & \vdots \\ C_{n0} & \cdots & C_{nn} \end{bmatrix} \quad \text{[Equation 3]}$$

In Equation 3, C_func (x, y) represents a color compensation code.

The flicker and color compensation unit 112 generates a compensation two-dimensional data code in which a flicker is removed and a color is compensated by applying a flicker removal code and a color compensation code to a two-dimensional data code that is generated in the code generator 111 (S514) and outputs the compensation two-dimensional data code to the modulation unit 113. The compensation two-dimensional data code is represented by Equation 4.

$$L\_func(x,y)=D\_func(x,y)\odot F\_func(x,y)\odot C\_func(x,y)$$ [Equation 4]

In Equation 4, L_func (x, y) represents a compensation two-dimensional data code, and ⊙ represents a predetermined operation. Here, operation may be multiplication and may be another method.

The modulation unit 113 generates a modulation signal by modulating a compensation two-dimensional data code according to a predetermined modulation method (S516) and outputs the modulation signal to the LED light emitting unit 114.

The LED light emitting unit 114 controls the turn-on of an LED module according to a modulation signal (S518) and transmits the modulation signal through light that is emitted from the LED module.

Figure 6A:
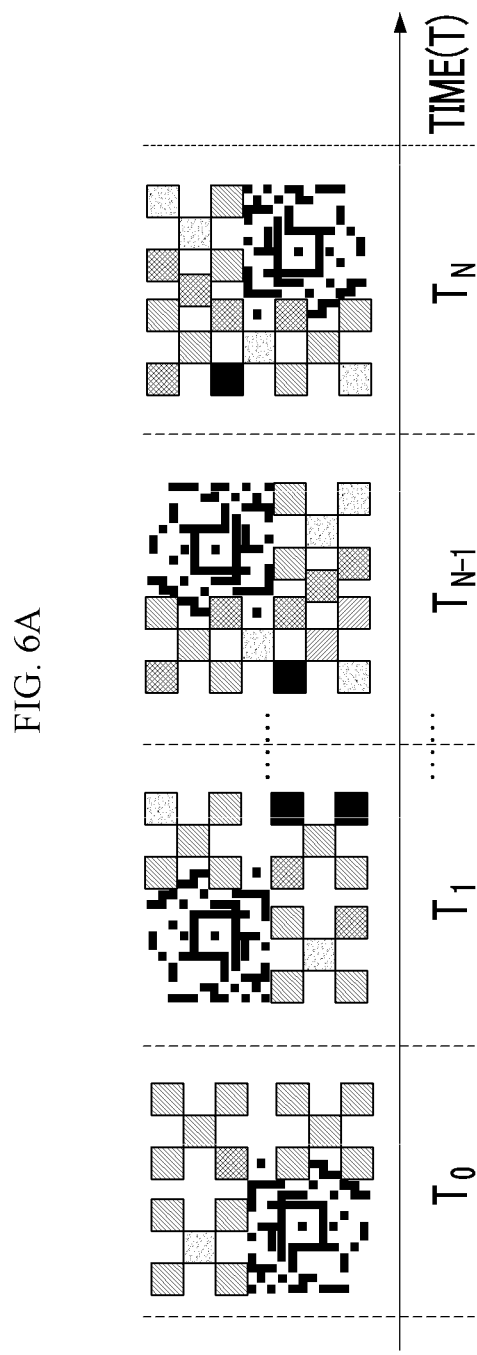
FIG. 6A is a diagram illustrating a method of generating a two-dimensional data code by a motion control according to an exemplary embodiment of the present invention.
Figure 6B:
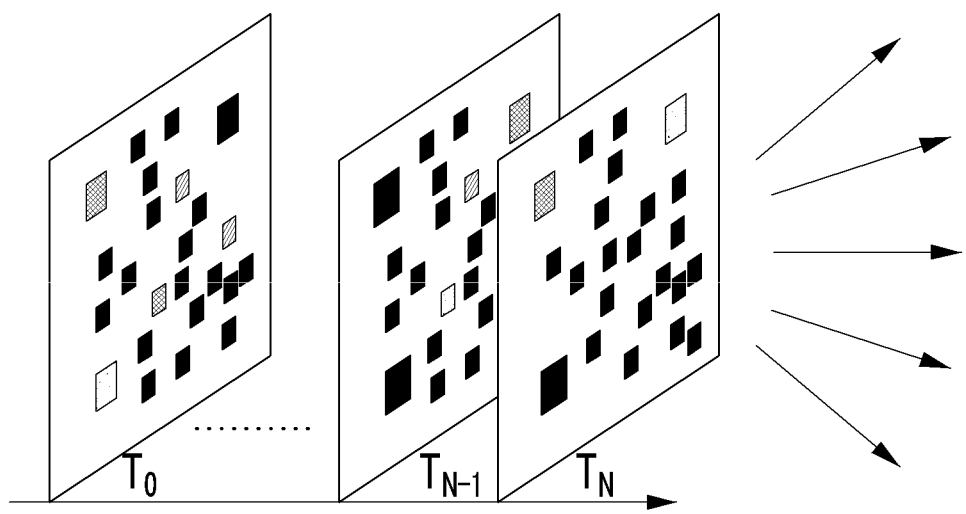
FIG. 6B is a diagram illustrating a change of light by a motion control according to an exemplary embodiment of the present invention.

FIG. 6A is a diagram illustrating a method of generating a two-dimensional data code by a motion control according to an exemplary embodiment of the present invention, and FIG. 6B is a diagram illustrating a change of light by a motion control according to an exemplary embodiment of the present invention.

If an entire size $S_D$ of a transmission data is larger than a predetermined threshold value $S_T$, a motion control is determined. Accordingly, the code generator 111 divides transmission data into data of a predetermined size, for example, a threshold value size, generates the data into a two-dimensional data code, and sequentially outputs the two-dimensional data code.

In this case, as shown in FIG. 6A, the code generator 111 converts data that are divided into a predetermined size to a two-dimensional data code having different colors and patterns according to times $T_0, T_1, \ldots, T_{N-1}, T_N$, and thus light sequentially changes, as shown in FIG. 6B. If two-dimensional data codes have the same color and pattern, it is difficult to distinguish previous data and present data. Therefore, the code generator 111 converts data that are divided into a predetermined size to a two-dimensional data code having different colors and patterns according to times $T_0, T_1, \ldots, T_{N-1}, T_N$ and thus one LED light source is interlocked with a peripheral LED light source and may be thus transmitted with various patterns and thus a data amount more than a data amount that can be expressed with one LED light source can be expressed, whereby a transmission amount can be increased.

Figure 7A:
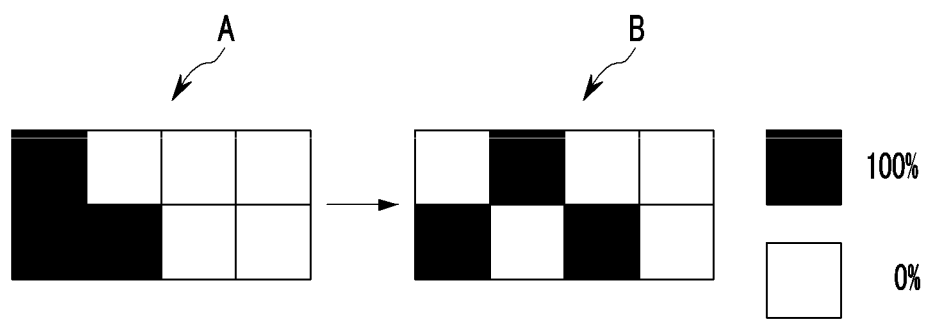
FIGS. 7A and 7B each are diagrams illustrating a method of generating a flicker removal code according to an exemplary embodiment of the present invention.
Figure 7B:
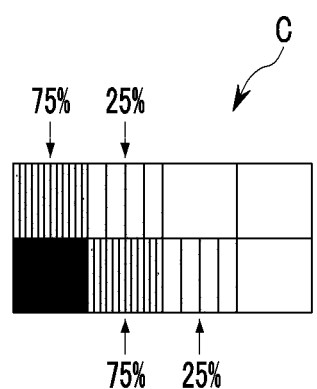

FIGS. 7A and 7B each are diagrams illustrating a method of generating a flicker removal code according to an exemplary embodiment of the present invention.

In FIGS. 7A and 7B, it is assumed that black indicates a light quantity of 100%, and white indicates a light quantity of 0%.

When a two-dimensional data code is expressed as A of FIG. 7A, if the two-dimensional data code is changed to B of FIG. 7A, a flicker may occur with a rapid change of a light quantity.

In general, fast on/off of an LED of 100 Hz or more makes a person not to feel a flicker. However, because a general image sensor is sensed with 60 frames per second (fps), the LED cannot be very quickly turned on/off.

Therefore, the flicker and color compensation unit 112 according to an exemplary embodiment of the present invention generates a flicker removal code in order to express a two-dimensional data code that expresses A of FIG. 7A like C of FIG. 7B. That is, when a flicker removal code is applied to the two-dimensional data code that expresses A of FIG. 7A, a light quantity of 100% within an area is distributed to a peripheral area and thus a compensation two-dimensional data code that expresses C of FIG. 7B may be generated.

Figure 8:
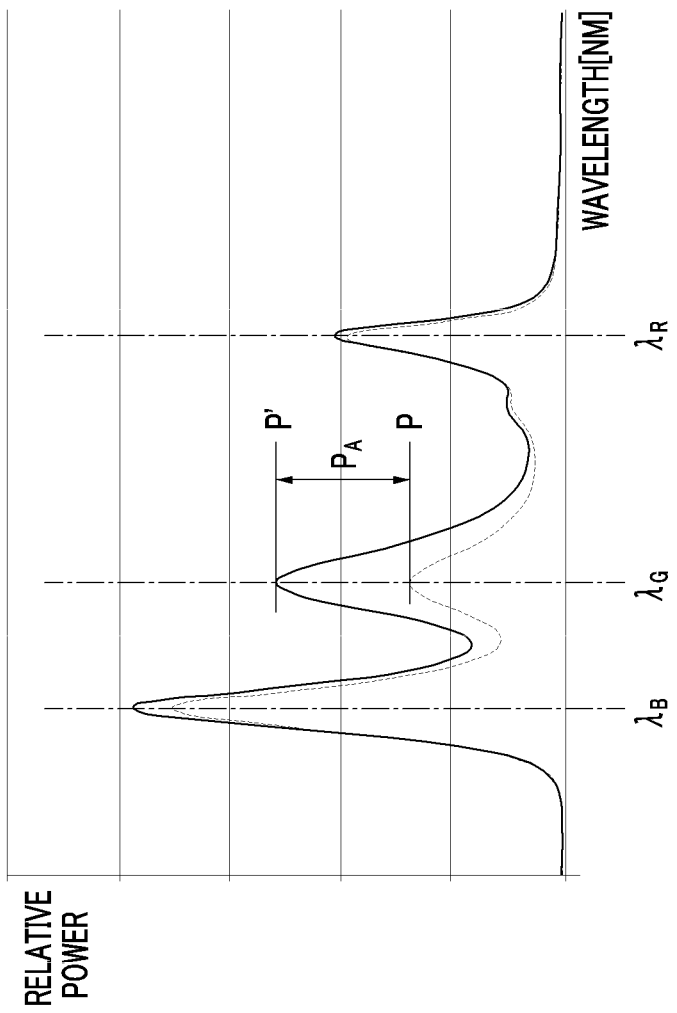
FIG. 8 is a graph illustrating a method of generating a color compensation code according to an exemplary embodiment of the present invention.

FIG. 8 is a graph illustrating a method of generating a color compensation code according to an exemplary embodiment of the present invention.

FIG. 8 illustrates an example of transmitting data in a green wavelength $\lambda_G$ while sustaining white in the LED light emitting unit 114.

First, in order to express white, a blue wavelength $\lambda_B$, a green wavelength $\lambda_G$, and a red wavelength $\lambda_R$ should exist, and even if peak power of the green wavelength $\lambda_G$ is set to a P level, it is assumed that white can be expressed.

Referring to FIG. 8, the flicker and color compensation unit 112 generates a color compensation code in order to transmit data when a power level of the green wavelength $\lambda_G$ is in a segment $P_A$ between P and P' within a range in which a person cannot detect. Here, P is a power level in which data are not transmitted in the LED light emitting unit 114, and P' is a power level in which data are transmitted in the LED light emitting unit 114.

That is, the color compensation code is a code that determines a wavelength to transmit data and a relative power level of the wavelength, and the flicker and color compensation unit 112 generates a color compensation code with a motion control signal, a color control signal, and a dimming control signal.

Figure 9:
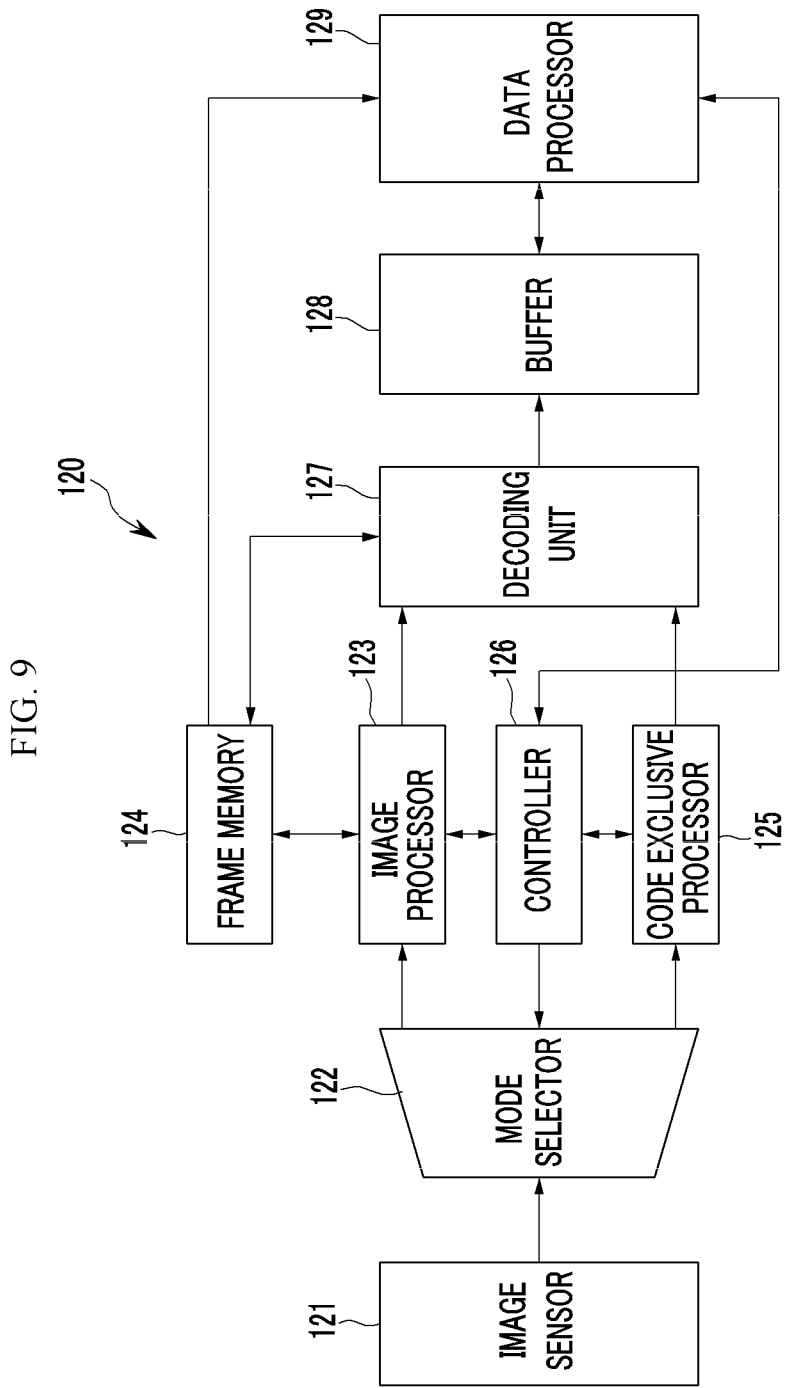
FIG. 9 is a block diagram illustrating a configuration of a terminal device according to an exemplary embodiment of the present invention.
Figure 10:
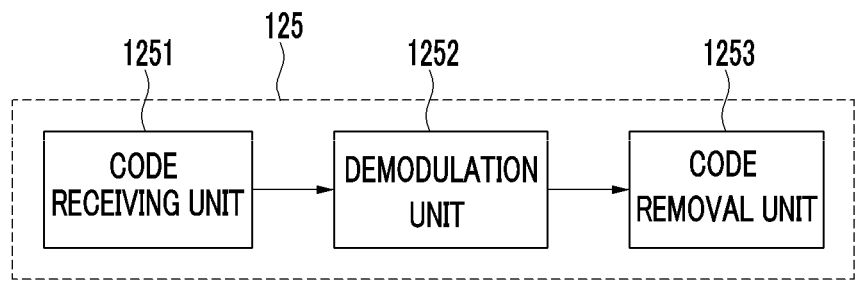
FIG. 10 is a block diagram illustrating a code exclusive processor that is shown in FIG. 9.

FIG. 9 is a block diagram illustrating a configuration of a terminal device according to an exemplary embodiment of the present invention, and FIG. 10 is a block diagram illustrating a code exclusive processor that is shown in FIG. 9.

Referring to FIG. 9, the terminal device 120 includes an image sensor 121, a mode selector 122, an image processor 123, a frame memory 124, a code exclusive processor 125, a controller 126, a decoding unit 127, a buffer 128, and a data processor 129.

The image sensor 121 detects light that passes through a lens and a filter (not shown), converts the light to an electric signal, generates an image having a corresponding color and brightness by performing an image processing of the electric signal, and outputs the image to the mode selector 122. The image can be generated within a resolution and frames per second of the image sensor 121.

If a receiving processing mode is an image mode, the mode selector 122 outputs a corresponding image to the image processor 123, and if a receiving processing mode is a code receiving mode, the mode selector 122 outputs a corresponding image to the code exclusive processor 125.

When a receiving processing mode is an image mode, the image processor 123 operates and processes an image that receives from the mode selector 122 and stores the image at the frame memory 124.

The frame memory 124 stores an image of each frame.

Referring to FIG. 10, when a receiving processing mode is a code receiving mode, the code exclusive processor 125 operates and includes a code receiving unit 1251, a demodulation unit 1252, and a code removal unit 1253. The code receiving unit 1251 receives an image from the mode selector 122, processes the image in a form that can be demodulated, and outputs the image to the demodulation unit 1252. The demodulation unit 1252 demodulates an image that is processed by the code receiving unit 1251 according to a predetermined demodulation method and outputs a compensation two-dimensional data code to the code removal unit 1253. The code removal unit 1253 generates a two-dimensional data code by removing a flicker removal code and a color compensation code from the compensation two-dimensional data code, and outputs the two-dimensional data code to the decoding unit 127.

Referring again to FIG. 9, the controller 126 controls the image sensor 121 and the mode selector 122 to correspond to receiving processing mode information that is received from the data processor 129. In this case, the receiving processing mode information may be information representing at least one of an image mode and a code receiving mode.

Further, the controller 126 controls operation of the image processor 123 and/or the code exclusive processor 125 to correspond to receiving processing mode information that is received from the data processor 129.

The decoding unit 127 decodes a two-dimensional data code using a code book and outputs decoded data to the buffer 128.

The buffer 128 stores the decoded data and outputs the decoded data to the data processor 129 according to a request of the data processor 129.

The data processor 129 determines a receiving processing mode according to a user application and transfers information of the determined receiving processing mode to the controller 126.

The data processor 129 receives images and/or decoding data from the frame memory 124 and/or the code exclusive processor 125 according to the determined receiving processing mode information, processes the images and/or decoding data to correspond to a user application, and transfers the images and/or the decoding data to a user application.

Further, the data processor 129 provides a code book having code decoding information to the decoding unit 127.

Figure 11:
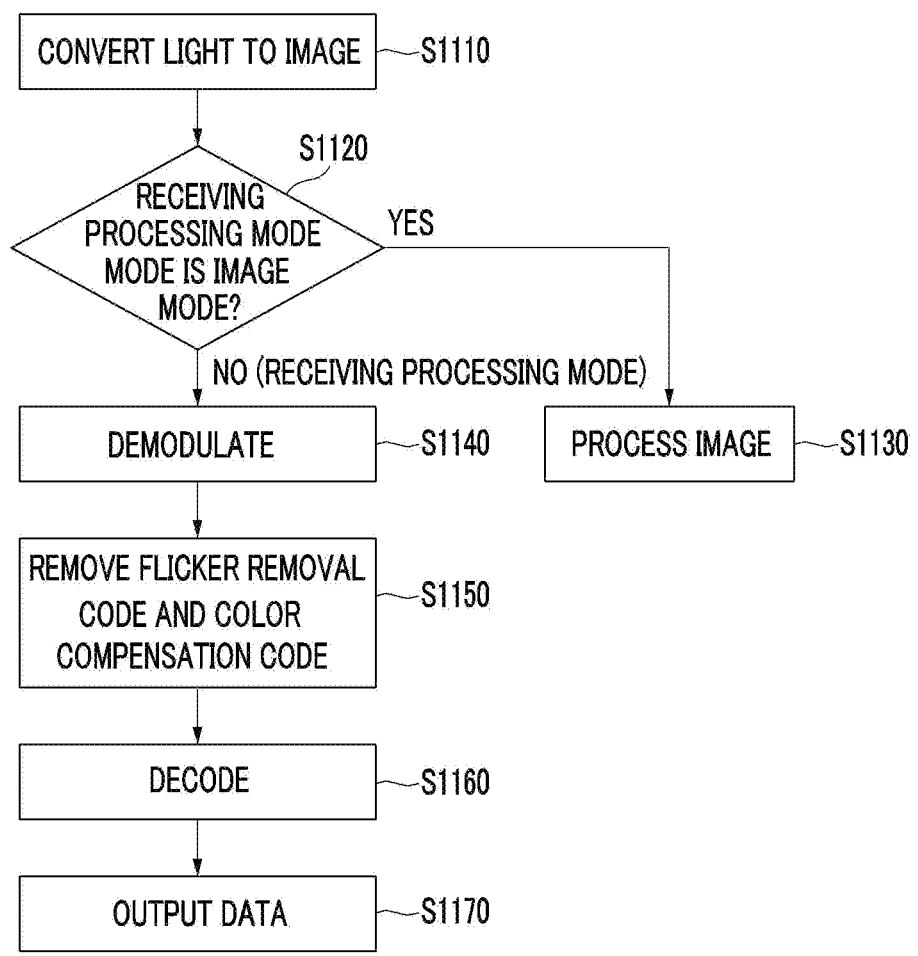
FIG. 11 is a flowchart illustrating a method of receiving data in a terminal device according to an exemplary embodiment of the present invention.

FIG. 11 is a flowchart illustrating a method of receiving data in a terminal device according to an exemplary embodiment of the present invention.

Referring to FIG. 11, the image sensor 121 of the terminal device 120 converts received light that passes through a lens and a filter (not shown) to an image having a corresponding color and brightness (S1110).

The mode selector 122 of the terminal device 120 outputs an image that is converted by the image sensor 121 to the image processor 123 and/or the code exclusive processor 125 according to the receiving processing mode information.

The controller 126 determines whether a receiving processing mode is an image mode (S1120), and if a receiving processing mode is an image mode, the image processor 123 of the terminal device 120 processes a corresponding image and inputs the corresponding image to a user application service (S1130). In this case, a method of extracting a two-dimensional data code as data while processing an image may be performed equally to a processing method when a receiving processing mode is a code receiving mode. That is, when extracting a two-dimensional data code as data while processing an image, the code exclusive processor 125 of the terminal device 120 demodulates an image that receives from the image sensor 121 according to a predetermined demodulation method, generates a two-dimensional data code by removing a flicker removal code and a color compensation code, and restores the two-dimensional data code to original data by decoding in the decoding unit 127. If a receiving processing mode is a code receiving mode at step S1120, the code exclusive processor 125 of the terminal device 120 demodulates an image that receives from the image sensor 121 according to a predetermined demodulation method (S1140), generates a two-dimensional data code by removing a flicker removal code and a color compensation code (S1150), and outputs the two-dimensional data code to the decoding unit 127.

Thereafter, the decoding unit 127 of the terminal device 120 restores data by decoding the two-dimensional data code using a code book (S1160) and outputs the restored data to a user application service (S1170).

According to an exemplary embodiment of the present invention, in an LED lighting device that can perform visible light communication, a receiver that transmits data into a two-dimensional data code through an LED light source of two-dimensional arrangement and that has an image sensor decodes data with reference to an already stored code book, thereby increasing an information amount of receiving data.

Further, when the LED lighting device transmits data, a flicker can be removed and a dimming control can be performed, and when color lighting is performed, a fatigue impression of eye due to a rapid color change can be removed, color compensation can be performed, and thus a width of a color rendering index change can be reduced.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting apparatus of data using visible light communication, the transmitting apparatus comprising:
    a code generator that converts transmission data to a two-dimensional data code according to a predetermined code method between the transmitting apparatus and a receiving apparatus;
    a modulation unit that generates a modulation signal by modulating the two-dimensional data code;
    a plurality of light emitting diodes (LED) that are arranged in a two-dimensional form and that emit light when turned on;
    a light source driver that controls a state of turn-on of the plurality of LEDs according to the modulation signal; and
    a controller that performs a motion control when a size of the transmission data is larger than a size of maximum data to be transmit by the plurality of LEDs,
    wherein the transmission data is transmitted according to the state of turn-on of the plurality of LEDs,
    wherein the code generator divides the transmission data into a predetermined size according to the motion control, generates each data into a two-dimensional data code, and sequentially outputs each two-dimensional data code to the modulation unit,
    wherein the each two-dimensional data code has different color and pattern.

2. The transmitting apparatus of claim 1, further comprising a flicker and color compensation unit that compensates a color of the two-dimensional data code using dimming data and color data of lighting control information that is input from the outside.

3. The transmitting apparatus of claim 1, further comprising a flicker and color compensation unit that removes a flicker from the two-dimensional data code by generating a flicker removal code using dimming data and color data of lighting control information that is input from the outside.

4. The transmitting apparatus of claim 3, wherein light quantity energy of the two-dimensional data code is distributed to the periphery by the flicker removal code.

5. A method of transmitting data using visible light communication in a transmitting apparatus, the method comprising:
- generating transmission data into a two-dimensional data code according to a predetermined code method between the transmitting apparatus and a receiving apparatus;
- modulating the two-dimensional data code into a modulation signal; and
- emitting light by controlling a state of turn-on of a plurality of LEDs that are arranged in a two-dimensional form according to the modulation signal,
- wherein the transmission data is transmitted according to the state of turn-on of the plurality of LEDs,
- wherein the generating of transmission data comprises dividing, if a size of the transmission data is larger than a predetermined threshold value, the transmission data into a plurality of data having a predetermined size by performing a motion control and converting the plurality of data to a plurality of two-dimensional data codes, respectively.

6. The method of claim 5, further comprising removing a flicker from the two-dimensional data code and compensating a color change before the modulating of the two-dimensional data code.

7. The method of claim 6, wherein the compensating of a color change comprises
- generating a flicker removal code for removing the flicker and a color compensation code for compensating the color change according to color data and dimming data of lighting control information that is input from the outside; and
- combining the flicker removal code and the color compensation code to the two-dimensional data code.

8. The method of claim 5, wherein the plurality of two-dimensional data codes have different colors and patterns.

* * * * *

UNITED STATES PATENT AND TRADEMARK OFFICE
CERTIFICATE OF CORRECTION

PATENT NO. : 9,112,606 B2  
APPLICATION NO. : 13/323331  
DATED : August 18, 2015  
INVENTOR(S) : You Jin Kim et al.

Page 1 of 1

It is certified that error appears in the above-identified patent and that said Letters Patent is hereby corrected as shown below:

On the title page add item (30) Foreign Application Priority Data

Dec. 15, 2010 (KR) .................... 10-2010-0128566  
May 30, 2011 (KR) .................... 10-2011-0051624

Signed and Sealed this  
Twenty-ninth Day of December, 2015

Michelle K. Lee  
*Director of the United States Patent and Trademark Office*